United States Patent [19]

Jenkins

[11] Patent Number: 5,601,752
[45] Date of Patent: Feb. 11, 1997

[54] DEFOAMER COMPOSITIONS AND PROCESS FOR DEFOAMING AQUEOUS SYSTEMS

[75] Inventor: Donald G. Jenkins, Duluth, Ga.

[73] Assignee: Nottingham Company, Atlanta, Ga.

[21] Appl. No.: 402,148

[22] Filed: Mar. 10, 1995

[51] Int. Cl.$^6$ .......................... B01D 19/04; C07C 233/01
[52] U.S. Cl. .......................... 252/321; 252/358; 564/159; 162/60; 162/72; 162/75; 162/158
[58] Field of Search .................... 252/331, 358; 564/159; 162/60, 72, 75, 158

[56] References Cited

U.S. PATENT DOCUMENTS

| | | | |
|---|---|---|---|
| 2,243,329 | 5/1941 | DeGroote et al. | 252/358 X |
| 2,540,678 | 2/1951 | Kelley | 252/358 X |
| 4,871,483 | 10/1989 | Friel, Jr. et al. | 554/56 |
| 4,946,625 | 8/1990 | O'Lenick, Jr. | 252/321 |
| 4,956,119 | 9/1990 | Friel, Jr. et al. | 252/321 |
| 4,960,540 | 10/1990 | Friel, Jr. et al. | 252/321 |
| 4,988,463 | 1/1991 | Walz et al. | 252/358 |
| 5,173,208 | 12/1992 | Chung et al. | 252/174.23 X |

OTHER PUBLICATIONS

T. J. Micich et al., "Wetting Properties of Nonionics From Branched Fatty Diamides", *JAOCS*, vol. 65, No. 5 (May 1988), pp. 820–825.

G. L. Solomons, "Aintifoams", *Process Biochemistry*, Oct., 1967, Reprinted by New Brunswick Scientific Co., Inc., New Brunswick, N.J.

Chemical Abstracts AN–1973:444084 (1973) CAPLUS.

Gorodnov et al., "Synthesis and Demulsifying Ability of Hydroxyethylated Ethylenediamides of Fatty Acids", Khim. *Tekhnol. Topl. Masel.*, 18(3), (1973) pp. 33–36.

Synthesis and surface Activity of Oxyethylated Ethylenediamides of Aliphatic Acids, V. P. Gorodnov and L. V. Mineev, Zhurnal Prikladonoi Khimii, vol. 47, No. 6. pp. 1342–1346, Jun., 1974.

*Primary Examiner*—Richard D. Lovering
*Assistant Examiner*—Daniel S. Metzmaier
*Attorney, Agent, or Firm*—Deveau, Colton & Marquis

[57] ABSTRACT

A defoaming composition of the following formula:

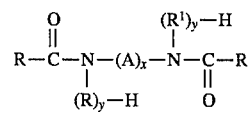

wherein R is a hydrocarbon radical of from 10–20 carbon atoms and made be either saturated, unsaturated and either linear or branched in structure; $R^1$ is a reactive alkoxy radical of from 2 to 4 carbon atoms; y is an interger of at least 1; A is an ethylene. propylene, or butylene group; and x is an integer of at least 1. The above composition can be used with oil-based defoaming aqueous system. The defoaming composition and process for defoaming are included.

11 Claims, No Drawings

DEFOAMER COMPOSITIONS AND PROCESS FOR DEFOAMING AQUEOUS SYSTEMS

BACKGROUND

Foam production is detrimental to the efficiency of many industrial processes that utilize aqueous solutions or suspensions. Many typical defoaming agents which are commonly employed control foam during these processes but may lead to deposition on process equipment requiring a costly clean up of the equipment and inconvenient down time. Examples of processing where foam is detrimental, and insoluble material deposition is common include, but are not limited to, paper manufacturing, paper deinking, textile processing, mining and sewage disposal systems. The insoluble defoaming particle may actually deposit upon the surface of the substrate being processed causing the processed substrate to be of inferior quality, thereby requiring additional removal. This results in increased costs to the manufacturer.

In the paper industry the Kraft process is one of the most frequently used alkaline pulping processes. It is valuable in that spent chemicals may be recycled and reused thus decreasing processing costs. A large disadvantage of this process is the occurrence of foam during the pulp screening and washing procedures.

The Kraft process as taught in U.S. Pat. No. 3,215,635 (Liebling) is generally described as being performed by first cooking the wood chips in digesters and then drawing off the spent chemicals for reuse. The resulting pulp fibers are then washed free of a large amount of chemicals in brown stock washers. These washers are a series of vats, usually three or four in number, which alternatively dilute the pulp with water and thicken it by picking it up on large rotary screens. From the brown stock washers, the pulp travels to the screen room where it is again diluted with water and put through vibrating screens which accept the now completely deliginified fibers and reject the clumps of unpulped fibers, knots and other foreign material. Foam problems are severe in the screen room since the pulp is subjected to violent agitation by the screens. The water removed from the pulp after the screening operations is referred to as dilute black liquor and, for the sake of economy, is normally used for dilution water for the third and fourth stage of the brown stock washers. The dilute black liquor is the foaming material, containing from about 0.001% to 0.1% by weight of solids and has a pH of about 12. The foaming of the dilute black liquor increases with the increase of the resin content of the wood used in this process.

Defoamers are generally used in most alkaline pulp mills during the screening operations so that a more efficient screening is accomplished and to prevent the pulp thickeners, utilized after the screening operations, from becoming clogged with entrapped air. The control or elimination of foam in the screening operation contributes to the overall washing of the pulp during the alkaline pulping process. This is accomplished by the fact that the screening efficiency of the pulp is increased, allowing ease of flow of the pulp throughout the thickeners and subsequent washers.

The mining industry also consumes defoamers. Flotation schemes, both reverse and aerated, separate finished products from known contaminates in the system by saponifying ions in the system and generating foam using saponified fatty acid.

The present defoamers that are used in alkaline pulp mills and in the mining industry often do not control foaming to a satisfactory extent. Consequently, there is need for new defoamers that control the production of foam to a greater extent than the present commercial defoamers.

PRIOR ART

There are many, well documented references to foam control agents in the literature. Most use (1) water insoluble components like mineral oil, ethylene bis-streamide, etc., or (2) emulsifier like soaps, ethoxylated esters, polyethylene glycol esters, etc. For example, U.S. Pat. No. 3,180,836 (Jursich) discloses that alkoxylated castor oil can be used as an emulsifier in foam control formulations. This composition functions like a standard non-ionic composition in the degree of foaming obtained.

Other documented references to foam control include new classes of compounds that utilize a cloud point mechanism in the defoaming action. Cloud point is defined as that temperature at which the test material becomes insoluble in water as shown by haze or insoluble material being present in the liquor. Thus, these compounds are insoluble above the reverse cloud temperature giving them particulate defoaming characteristics, while being soluble below the cloud point temperature, negating residual buildup on process equipment or matter.

U.S. Pat. No. 4,946,625 (O'Lenick) discloses a defoamer which is the reaction product of an alkoxylated ether amine reacted with a diacid to produce a defoaming alkoxylated bis-amide. This defoamer is used to control foaming in aqueous systems, such as in the paper de-inking process used in the Kraft process in the paper industry and in textile wet processing. This process is based upon a cloud point mechanism.

U.S. Pat. No. 4,960,540 (Friel, Jr., et al.) discloses the use of an alkoxylated bis-amide as a defoamer. This is the reaction product of an alkoxylated alcohol, unsaturated monoacid and an aliphatic diamide. This defoamer also controls foaming based upon a cloud point mechanism. This defoamer is also used in the aqueous Kraft process.

U.S. Pat. No. 4,871,483 (Friel, Jr., et al.) also discloses the use of an alkoxylated bis-amide as a defoamer in the Kraft process and the textile wet processing process.

U.S. Pat. No. 4,956,119 (Friel, Jr., et al.) also discloses the use of an alkoxylated bis-amide as a defoamer in the Kraft process and textile process.

BACKGROUND OF THE INVENTION

The defoamers discussed in the Prior Art section operate on the particulate cloud point mechanism and are non-depositing on the equipment. While these compounds are defoamers, there are a number of serious drawbacks to their use. In the first place, they require the use of expensive raw materials and require several different steps to synthesize the compound. Because these compounds contain an alkoxylate, it is difficult to control the location where this radical is placed on the molecule during synthesis, which will result in different chemical and physical properties of the defoamer.

The inverse cloud point phenomena which occurs as one heats an aqueous solution to a critical temperature has been well documented. More detailed descriptions are listed in A. M. Schwartz and J. W. Perry "Surface Active Agents" Vol. I (1949); and "Surface Active Agents and Detergents", Vol. II (1958), Interscience Publishers, New York. Standard nonionic compounds which exhibit this cloud point phenomena do not exhibit defoaming properties and consequently are not effective in defoaming processes.

The compounds cited in the patents discussed above defoam aqueous solutions because an insoluble oil phase disrupts the foam at the foam/air/water interface by replacement with an air/oil/water interface. The three critical components of emulsified oil systems are (1) water, (2) an insoluble oil in wax to defoam, and (3) an emulsifier or dispersant present to disperse the insoluble oil in wax.

During the paper manufacturing process, combinations of the components referred to above are added to initiate anti-foam action in the aqueous solution above ambient temperature with subsequent removal of the water from the matter being processed. Defoaming of other aqueous solutions, such as textile material or sewage, also results in the subsequent removal of the water from the matter being processed.

When the compounds referred to in the Prior Art section are used subsequent removal of water from the matter being processed results in the "raining" out of insoluble materials causing "pitch" buildup. Pitch is the insoluble wax of oil that deposits on the equipment after the defoamer has worked and water has been removed. Pitch build-up results in considerable down time and increased expense is involved to clean up equipment. Consequently, it is a primary object of this invention to provide "defoaming" compositions which can be in combination with oil-based, water-extended and water-based defoamers to defoam aqueous processes which run above ambient temperatures and under different process conditions (i.e., solids content and pH level).

It is an object of this invention to provide defoaming compositions that can be used for the reduction of existing foam (knockdown) and the prevention of foam formation (hold-down). Both of these conditions frequently occur in brown stock washer liquor during the pulping process and in the dilute black liquor in the screening process in paper making.

It is a specific object of this invention to develop new defoaming compositions for use in the alkaline pulp mill. It is a further object to develop new defoaming compositions that control the production of foam to a greater extent than the present commercial defoamers.

Another object of this invention is to develop new defoaming compositions that are less expensive than many of the present defoaming compositions and which can be produced with greater consistency in the uniformity of the reaction product than is the case with many defoamers.

INVENTION

The invention relates to a defoamer compound which is the reaction product of a bis-amide, an organic alkyene oxide, and an inorganic alkaline catalyst. The resulting reaction product is (1) higher molecular weight than the starting bis-amide, (2) possesses alkoxy groups on the bis-amide nitrogen(s), and (3) are particulate cloud point defoamers that are non-depositing on process equipment or matter being processed. Bis-amides are available in commerce and can be prepared by reacting, in a 2:1 ratio, a carboxylic acid with an aliphatic diamine with or without the presence of a catalyst. The Witco Corporation markets such products under the name Kenamide®. The alkyene oxide reaction product has from 2 to 4 carbon atoms. Examples of such alkyene oxides are ethylene oxide, propylene oxide, and butylene oxide. Suitable inorganic alkaline catalysts include sodium hydroxide, potassium hydroxide, and cesium hydroxide.

The compound prepared by this reaction has the following structure:

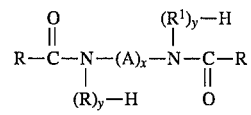

wherein:

R is a hydrocarbon radical of from 10–20 carbon atoms and may be either saturated, unsaturated and is either linear or branched in structure;

$R^1$ is a reactive alkoxy radical of from 2 to 4 carbon atoms;

y is an interger of at least 1;

A is an ethylene, propylene, or butylene group;

x is an integer of at least 1.

Compounds of the above formula can be prepared in accordance with the teachings in an article entitled "Synthesis and Surface Activity Oxyethylated Ethylenediamides of Aliphatic Acids" by V. P. Gordonov and L. V. Mineev and published in the journal *Zhurnal Prikladonoi Khimii*, Vol 47, No. 6. pp. 1342–1346, June 1974.

It is preferred that R have between 10 and 20 carbon atoms and that it be saturated and linear in structure. More preferably, R has between 14 and 18 carbon atoms. It is preferred that A be an ethylene radical and that x be 1. It is preferred that $R^1$ be ethyleneoxy, propyleneoxy or butyleneoxy radical. $R^1$ can also be any combination of ethyleneoxy, propyleneoxy and butyleneoxy radicals. Preferably $R^1$ is an ethyleneoxy radical. It is preferred that y be either 1 or 2. The preferred compound is N, N'-dihydroxyethyl-N, N'-ethanediyl (bis) dioctadecyldiamide which can be prepared by reacting ethylene carbonate with ethylene-bis-stearamide. It has the following formula:

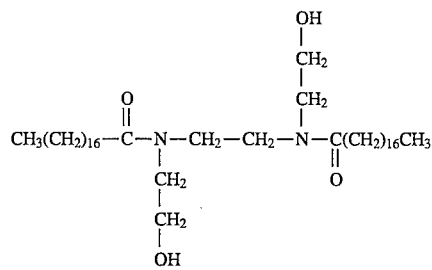

It is typical that from 5 to 80 moles of ethylene carbonate be used per mole of ethylene-bis-stearamide. Best results are obtained when from 4 to 8 moles of ethylene carbonate is used per mole of ethylene-bis-stearamide.

The defoamers of this invention accomplish the defoaming of aqueous processes which run above ambient temperature and under different process conditions. This is accomplished by effecting a cloud point phenomena whereby insolubility, and thus defoaming, occurs at or above the process temperature, while solubility occurs below the solution's cloud point temperature. Under these circumstances the defoaming compounds of this invention are non-depositing on the process equipment.

The defoamers of this invention are used in combination with oil-based, water-extended and water-based defoamers. The oil may be a natural petroleum oil or a synthetic oil, such as polybutene. Amoco Corporation makes such products under the name Indopol®. Other processes in paper making where the current invention might find utility as a defoamer include, but are not limited to, soda pulping and neutral sulfite semi-chemical pulping.

The compositions of this invention are useful both in reducing existing foam (knockdown) and prevention of foam formation (hold-down) which occurs, for example, in brown stock washer liquor during the pulping process. When used for this purpose, from about 0.002 to about 0.5 parts by weight of the defoamer composition of this invention (based upon solids) are added to the pulp per 100 parts by weight of dry pulp. The defoamer composition of this invention is mixed with oil-base defoamers prior to adding to the liquor. From about 0.08 to about 3% by weight of the oil-based defoamer are added to the pulp per 100 parts by weight of dry pulp. The defoaming formulation used includes from 0.05 to 20% of the compound of this invention with the remaining oil-based defoamer constituting from 80 to 99.5% of the formulation. Preferably the defoaming composition of this invention constitutes from 0.05 to 5% of the formulation.

The defoamers of this invention can be used in combination with oil-based defoamers to defoam aqueous solutions used in paper de-inking, textile processing, mining and sewage disposal systems.

While the invention has been disclosed in its preferred form, it will be apparent to those skilled in the art that many modifications, additions and deletions can be made therein without departing from the spirit and scope of the invention and its equivalents as set forth in the following claims.

EXAMPLES

The test method from U.S. Pat. No. 4,225,456 was used with the following apparatus to determine the effectiveness of various defoamer compositions in knocking down and holding down foam in a brown stock washer liquid from pulping processes and the dilute black liquor from screening processes in paper making.

A 1000 cc beaker is used as the primary container for the liquor to be tested. A curved glass outlet fused onto the base of the breaker is connected with a rubber hose to a centrifugal pump. The pump is used to circulate continuously the test liquid from the beaker back into the pump and then back into the beaker. Pumping is carried out at a rate so that the test liquid in the beaker is agitated by the reentering test liquid to such an extent that foam forms.

The pumping rate is about 2 gallons per minute. Test liquid enters the beaker at a point about 5 centimeters above the surface of the liquid in the beaker and strikes the surface of the liquid in the beaker at an angle of 90 degrees.

In carrying out the testing of the defoamer composition, 500 cc of freshly obtained concentrated brown stock washer liquor or dilute black liquor is charged at about 80° C., into the beaker. Thus liquor, when quiescent, fills the beaker to a level of about 8 centimeters from the bottom. This level is marked and labeled. In the test for hold down, 0.1 cc of defoamer formulation is added to the 500 cc of liquor in the beaker. The defoaming formulation containing the defoaming composition of this invention and an oil-based defoamer were added to the beaker. Air was then pumped into the beaker raising the level of the liquor to Level 17 and the time and level obtained were recorded for the reduction of the foam. The time required for the foam to reach various levels after the knockdown was also recorded.

As demonstrated by the examples, the composition of this invention is superior as a defoamer to the standard ethylene-bis-stearamide in oil-based defoamer formulations for use in aqueous solutions. The pump and stop watch are started simultaneously. Height of the foam above the labeled line is measured at 15 second intervals for the first minute, then at 30 second intervals, and recorded. In the test for knockdown, the liquor is agitated and heated prior to the addition of any defoamer composition. After a foam has built up to a predetermined level, 0.1 cc of the defoamer composition to be tested is added and the data is recorded as above.

Several defoaming formulations were prepared in accordance with Examples 1 and 2 below. In the testing, the brown stock washer liquor or paper machine filtrate was added to a beaker and filled to a predetermined level in the beaker which was marked.

EXAMPLE 1

Four defoaming formulations were prepared in accordance with the percentages of ingredients in the formulations set forth in Table I. Example A is the compound, N,N'-dihydroxyethyl-N,N'-ethanediyl (bis) dioctadecyldiamide. This compound was prepared by reacting ethylene carbonate with ethylene-bis-stearamide in a ratio 5 moles of ethylene carbonate per mole of ethylene-bis-stearamide. In Example B 8 moles of ethylene carbonate were used for each mole of ethylene-bis-stearamide. The formulations were prepared by simply mixing the ingredients together in the percentages set forth in Table I. This example compares the effectiveness of a compound prepared according to this invention to the standard ethylene-bis-stearamide in an oil-based defoaming formulation. 100 microliters of each of these formulations was added to a 500 cc batch of brown stock washer liquor obtained from a pulping process which reached Level 9 marked on the beaker. Air was pumped into the beaker until the height of the foam reached Level 17. The time for the knockdown and the level of the knockdown is set forth in Table III. The time required for the foam to reach the various levels after the knockdown is set forth in Table III. Formulation 1 in Table III is a standard for the test. It is readily apparent that Formulation 2 is superior in both knockdown and hold-down characteristics to Formulation 1. In respect to knockdown, Formulation 2 only required 5 seconds to reach a level of 9.5 as opposed to 6 seconds for Formulation 1. In respect to hold-down, it required more time for the foam to increase to the various levels when using Formulation 2 than Formulation 1. Formulation 3 produces slightly better results than Formulation 1.

EXAMPLE 2

Defoaming Formulations 6–9 were prepared in accordance with the procedure set forth in Example 1 with the percentages of ingredients in the formulations set forth in Table II. Emulsifier #1 is polyoxyethylene glycol oleate. Emulsifier #2 is sorbitan monooleate. In this case, the defoamers were tested with the filtrate obtained from the screening of the pulp at different pH levels. The results are set forth in Tables IV–VI. The liquor was added to the beaker to the Level 9 along with the defoamer. The liquor contained some foam and entrained air. Consequently, in some cases, the defoamer brought the liquor level lower than what it was originally in the beaker. The amount of time for the foam to reach various levels is set forth in the Tables. Formulation 6 is a standard against which all the other formulations are measured. Formulation 9 shows superior knockdown and hold-down time in all the cases tested. Formulations 7–8 are equal to the standard Formulation 6 in Table IV. Formulations 7–8 in Table V and VI are equal to or somewhat better than standard Formulation 6.

TABLE I

DEFOAMING FORMULATIONS PERCENTAGES
FORMULATION NUMBER

| INGREDIENT | 1 | 2 | 3 | 4 |
|---|---|---|---|---|
| Paraffinic oil | 88 | 88 | 88 | 85 |
| Ethylene-bis-stearamide | 3.0 | X | X | X |
| Silica in oil | 8.00 | 8.00 | 8.00 | 14.00 |
| Example A | X | 3.00 | X | X |
| Example B | X | X | 3.00 | X |
| Silicone | 1.00 | 1.00 | 1.00 | 1.00 |
| Total | | | 100.00% | |

TABLE II

DEFOAMING FORMULATIONS PERCENTAGE
FORMULATION NUMBER

| INGREDIENT | 6 | 7 | 8 | 9 |
|---|---|---|---|---|
| Paraffinic oil | 35 | 35 | 35 | 40.5 |
| Ethylene-bis-stearamide | 3.5 | X | X | X |
| Example A | X | 3.5 | X | X |
| Example B | X | X | 3.5 | X |
| Example A | X | X | X | 3.5 |
| Emulsifier #1 | 6.00 | 6.00 | 6.00 | 1.00 |
| Emulsifier #2 | 1.00 | 1.00 | 1.00 | .50 |
| Silica in oil | 1.00 | 1.00 | 1.00 | 1.00 |
| Water | 53 | 53 | 53 | 53 |
| Preservative | .5 | .5 | .5 | .5 |
| Total | | | 100.00% | |

TABLE III

BROWN STOCK WASHER DEFOAMER EVALUATION
(GEORGIA BLACK LIQUOR)
DOSAGE 100 MICROLITERS - pH 13

| | Knockdown Level | Time (Secs) | Hold-Down Levels | | | | |
|---|---|---|---|---|---|---|---|
| | | | 9 | 11 | 13 | 15 | 17 |
| | | | | Time (Secs) | | | |
| Formulation 1 | 9.5 | 6.0 | — | 15 | 70 | 97 | 115 |
| Formulation 2 | 9.5 | 5.0 | — | 17 | 80 | 106 | 130 |
| Formulation 3 | 9.0 | 5.5 | — | 15 | 68 | 95 | 111 |
| Formulation 4 | — | — | no knockdown/no defoaming | | | | |

TABLE IV

SCREEN ROOM DEFOAMER EVALUATIONS
(GEORGIA SCREEN ROOM LIQUOR)
DOSAGE 100 MICROLITERS - pH 9.8

| | Knockdown Level | Time (Secs) | Hold-Down Levels | | | | |
|---|---|---|---|---|---|---|---|
| | | | 9 | 11 | 13 | 15 | 17 |
| | | | | Time (Secs) | | | |
| Formulation 6 | 7.5 | 5.5 | 48 | 69 | 83 | 97 | 104 |
| Formulation 7 | 7.5 | 6.0 | 45 | 64 | 82 | 95 | 106 |
| Formulation 8 | 7.5 | 6.5 | 38 | 59 | 73 | 87 | 92 |
| Formulation 9 | 7.0 | 4.0 | 55 | 82 | 132 | 172 | 187 |

TABLE V

SCREEN ROOM DEFOAMER EVALUATIONS
(GEORGIA SCREEN ROOM LIQUOR)
DOSAGE 80 MICROLITERS - pH 7.1

| | Knockdown Level | Time (Secs) | Hold-Down Levels | | | | |
|---|---|---|---|---|---|---|---|
| | | | 9 | 11 | 13 | 15 | 17 |
| | | | | Time (Secs) | | | |
| Formulation 6 | 9.0 | 8.5 | 26 | 47 | 63 | 73 | 82 |
| Formulation 7 | 8.0 | 8.0 | 27 | 52 | 64 | 79 | 89 |
| Formulation 8 | 8.0 | 8.0 | 22 | 48 | 59 | 72 | 84 |
| Formulation 9 | 8.0 | 5.5 | 33 | 59 | 77 | 90 | 104 |

TABLE VI

PAPER MACHINE DEFOAMER EVALUATIONS
(GEORGIA PAPER MACHINE FILTRATE)
DOSAGE 70 MICROLITERS - pH 5.8

| | Knockdown Level | Time (Secs) | Hold-Down Levels | | | | |
|---|---|---|---|---|---|---|---|
| | | | 9 | 11 | 13 | 15 | 17 |
| | | | | Time (Secs) | | | |
| Formulation 6 | 8.0 | 8.0 | 43 | 66 | 92 | 100 | 106 |
| Formulation 7 | 7.0 | 5.0 | 50 | 70 | 83 | 93 | 99 |
| Formulation 8 | 7.0 | 6.0 | 46 | 70 | 84 | 93 | 99 |
| Formulation 9 | 7.0 | 3.0 | 72 | 106 | 132 | 140 | 153 |

I claim:

1. In a process of controlling foam in an aqueous foaming system which includes the addition of foam control agents to said system, wherein the improvement is adding a composition of the following formula as one of the foam control agents with at least one other defoamer:

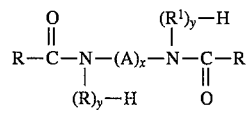

wherein:

R is a hydrocarbon radical having from 10–20 carbon atoms selected from the group consisting of linear and branched alkyl radicals and linear and branched unsaturated radicals;

$R^1$ is a reactive alkoxy radical of from 2 to 4 carbon atoms;

y is an integer of at least 1;

A is selected from the group consisting of ethylene, propylene and butylene radicals; and x is an integer of at least 1.

2. The process of claim 1 in which $R^1$ is an ethyleneoxy radical.

3. The process of claim 1 in which $R^1$ is a combination of ethyleneoxy and propyleneoxy radicals.

4. The process of claim 1 wherein said aqueous foaming system is selected from the group consisting of aqueous brown stock obtained from the pulping process and the dilute black liquor obtained from screening the pulp in a pulping process.

5. The process of claim 4 in which the other defoamer is selected from the group consisting of oil-based, water-extended and water-based defoamers.

6. The process of claim 5 in which the total amount of all defoamer compositions added to the aqueous solution is from 0.05 to 5% by dry weight of any solids in the aqueous system.

7. The process of claim 5 in which said other defoamer is an oil-based defoamer and said one of the foam control agents defined by said formula is present in an amount of 0.05 to 20% by weight of the total amount of defoamers present.

8. In a process of controlling foam in an aqueous foaming system which includes the addition of foam control agents to said system, wherein the improvement is adding N, N'-dihydroxyethyl-N, N'- ethanediyl (bis) dioctadecyldiamide with at least one other defoamer.

9. The process of claim 8 in which the other defoamer is selected from the group consisting of oil-based, water-extended and water-based defoamers.

10. A defoaming composition comprising a mixture of:

a. a composition of the following formula:

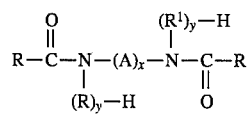

wherein:
- R is a hydrocarbon radical having from 10–20 carbon atoms selected from the group consisting of linear and branched alkyl radicals and linear and branched unsaturated radicals;
- $R^1$ is a reactive alkoxy radical of from 2 to 4 carbon atoms;
- y is an integer of at least 1;
- A is selected from the group consisting of ethylene, propylene and butylene radicals; and
- x is an integer of at least 1; and b. a defoamer selected from the group consisting of oil-based, water-extended and water-based defoamers.

11. A defoaming composition comprising a mixture of N, N'- dihydroxyethyl- N, N'- ethanediyl (bis) dioctadecyldiamide and a defoamer selected from the group consisting of off-based, water-extended, and water-based defoamers.

* * * * *

UNITED STATES PATENT AND TRADEMARK OFFICE
CERTIFICATE OF CORRECTION

PATENT NO. : 5,601,752
DATED : Feb. 11, 1997
INVENTOR(S) : JENKINS, Donald G.

It is certified that error appears in the above-indentified patent and that said Letters Patent is hereby corrected as shown below:

In REFERENCES CITED, line 15, change "Aintifoams" to --Antifoams--;

In the ABSTRACT, lines 2-7, change

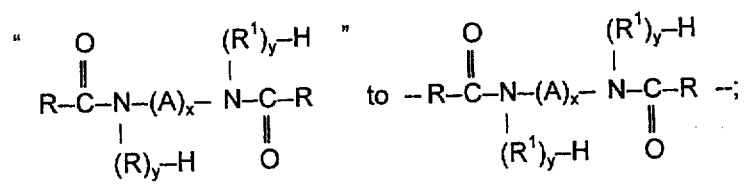

At Col. 4, lines 3-8, change

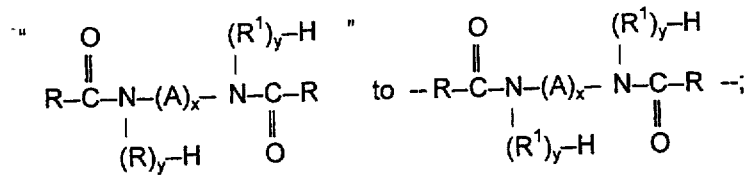

At Col. 8, lines 38-43, change

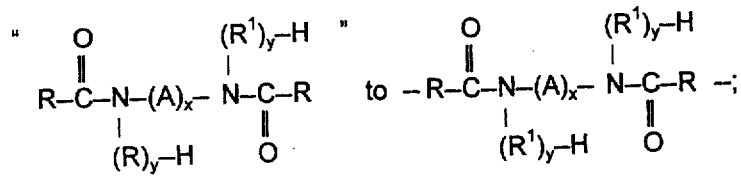

UNITED STATES PATENT AND TRADEMARK OFFICE
CERTIFICATE OF CORRECTION

PATENT NO. : 5,601,752
DATED : Feb. 11, 1997
INVENTOR(S) : JENKINS, Donald G.

It is certified that error appears in the above-indentified patent and that said Letters Patent is hereby corrected as shown below:

At Col. 10, lines 2-7, change

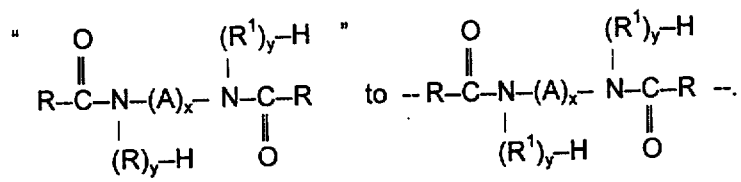

Signed and Sealed this

Nineteenth Day of August, 1997

*Attest:*

BRUCE LEHMAN

*Attesting Officer*   *Commissioner of Patents and Trademarks*